United States Patent
Harada et al.

(10) Patent No.: US 10,097,035 B2
(45) Date of Patent: *Oct. 9, 2018

(54) UNINTERRUPTIBLE POWER SUPPLY UNIT

(71) Applicant: FDK CORPORATION, Tokyo (JP)

(72) Inventors: Takuya Harada, Tokyo (JP); Takashi Kabasawa, Tokyo (JP); Jinichi Sakamoto, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/316,457

(22) PCT Filed: Apr. 10, 2015

(86) PCT No.: PCT/JP2015/061245
§ 371 (c)(1),
(2) Date: Dec. 5, 2016

(87) PCT Pub. No.: WO2015/198687
PCT Pub. Date: Dec. 30, 2015

(65) Prior Publication Data
US 2017/0155276 A1    Jun. 1, 2017

(30) Foreign Application Priority Data
Jun. 26, 2014  (JP) .................................. 2014-131191

(51) Int. Cl.
*H02J 9/06*     (2006.01)
*H02J 7/00*     (2006.01)

(52) U.S. Cl.
CPC ............ *H02J 9/061* (2013.01); *H02J 7/0068* (2013.01); *H02J 7/0077* (2013.01)

(58) Field of Classification Search
CPC ......... H02J 9/061; H02J 7/0068; H02J 7/0077
See application file for complete search history.

(56) References Cited

U.S. PATENT DOCUMENTS 5,811,895 A * 9/1998 Suzuki .................... H02J 9/061
                                                         307/116
5,898,234 A * 4/1999 Kitagawa .................. H02J 9/06
                                                          307/48

(Continued)

FOREIGN PATENT DOCUMENTS

JP     2002-199620 A     7/2002
JP     2005204421        7/2005

(Continued)

OTHER PUBLICATIONS

English translation of International Search Report and Written Opinion in Japanese dated Jun. 30, 2015, for corresponding PCT Application No. PCT/JP2015/061245.

(Continued)

*Primary Examiner* — Daniel Kessie
(74) *Attorney, Agent, or Firm* — Kinney & Lange, P.A.

(57) ABSTRACT

An uninterruptible power supply unit includes: an input/output terminal connected in parallel with a power supply line which supplies power from an external power supply to a load device; a battery unit whose rated voltage is a voltage equal to a voltage of the external power supply; a DC/DC converter for converting the voltage of the external power supply into an output voltage corresponding to a difference between the rated voltage of the battery unit and the charging voltage of the battery unit; a charging circuit for charging the battery unit with a voltage equal to the voltage of the external power supply added with the output voltage of the DC/DC converter; and a discharging circuit that discharges power to the load device from the battery unit through the input/output terminal in the event that the external power supply is interrupted.

2 Claims, 2 Drawing Sheets

(56) References Cited

U.S. PATENT DOCUMENTS

| | | | | | |
|---|---|---|---|---|---|
| 6,204,633 | B1* | 3/2001 | Kitagawa | | H02J 7/0068 |
| | | | | | 320/128 |
| 6,291,973 | B1* | 9/2001 | Lee | | H02J 7/0031 |
| | | | | | 320/128 |
| 6,525,666 | B1* | 2/2003 | Shimoda | | H02J 9/005 |
| | | | | | 340/635 |
| 6,777,913 | B2* | 8/2004 | You | | H02J 7/0013 |
| | | | | | 320/125 |
| 7,202,634 | B2* | 4/2007 | Bucur | | H02J 7/0018 |
| | | | | | 320/137 |
| 7,761,718 | B2* | 7/2010 | Yasuo | | G06F 1/263 |
| | | | | | 307/43 |
| 8,324,758 | B2* | 12/2012 | Ogg | | H02J 9/061 |
| | | | | | 307/65 |
| 2002/0191421 | A1* | 12/2002 | Liao | | H02M 3/335 |
| | | | | | 363/17 |
| 2004/0113585 | A1* | 6/2004 | Stanesti | | H02J 7/0018 |
| | | | | | 320/116 |
| 2006/0078773 | A1* | 4/2006 | Speranza | | H01M 8/04626 |
| | | | | | 429/9 |
| 2011/0089886 | A1 | 4/2011 | Dubovsky | | |
| 2012/0105008 | A1* | 5/2012 | Lipcsei | | H02J 7/0031 |
| | | | | | 320/134 |
| 2014/0217820 | A1* | 8/2014 | Imai | | H02J 7/0068 |
| | | | | | 307/26 |

FOREIGN PATENT DOCUMENTS

| | | |
|---|---|---|
| JP | 2005-304142 A | 10/2005 |
| JP | 2007-306662 A | 11/2007 |
| JP | 2009-296820 A | 12/2009 |
| JP | 2013-110899 A | 6/2013 |

OTHER PUBLICATIONS

Button, Robert M., "An Advanced Photovoltaic Array Regulator Module", Institute of Electrical and Electronics Engineers, 1996, 6 pages.

Extended European Search Report, for European Patent Application No. 15812581.5, dated Dec. 7, 2017, 15 pages.

* cited by examiner

UNINTERRUPTIBLE POWER SUPPLY UNIT

TECHNICAL FIELD

The present invention relates to an uninterruptible power supply unit.

BACKGROUND ART

An uninterruptible power supply unit is a power supply unit that supplies power to a load device from a secondary battery which is charged in advance to allow the load device to continue its operation when power supply to the load device from an external power supply is discontinued due to a power breakdown, etc. It is general that the secondary battery for the uninterruptible power supply unit is charged with power of an external power supply during normal time. As an example of the secondary battery used for the uninterruptible power supply unit, for example, an alkaline secondary battery such as a nickel-hydrogen secondary battery is publicly known.

An alkaline secondary battery, by its nature, needs to be charged with a voltage higher than its rated voltage. However, in general, in an uninterruptible power supply unit, the rated voltage of the alkaline secondary battery is a voltage same as the voltage of the external power supply. For that reason, it is not possible to charge the alkaline secondary battery to a fully charged state with the power of the external power supply as it is.

Under these circumstances, an uninterruptible power supply unit equipped with an auxiliary power supply (DC/DC converter) for boosting the voltage of the external power supply is publicly known. To be more specific, when the alkaline secondary battery is charged, the voltage of the external power supply is boosted by an auxiliary power supply and the alkaline secondary battery is charged with the boosted voltage. As a result of this, even if the alkaline secondary battery has a rated voltage which is same as the voltage of the external power supply, it is possible to charge the alkaline secondary battery to a fully charged state with a voltage higher than the rated voltage. Moreover, as an example of technique which utilizes an auxiliary power supply, though which is not an uninterruptible power supply unit, a motor control unit in which the amount of power which can be supplied to an electric motor is increased by the auxiliary power supply when power demand of the electric motor temporarily increases is publicly known (for example, see Patent Document 1).

However, the conventional art which boosts the voltage of the external power supply with an auxiliary power source, and charges the alkaline secondary battery with the boosted voltage has a problem in that significant power loss occurs during charging. Moreover, in such the conventional art, heat generation of the auxiliary power supply caused by the power loss may lead to a problem in terms of the reliability of the uninterruptible power supply unit. To address such problem, for example, there is publicly known a charging control unit for performing split charging control, in which when a secondary battery including a plurality of unit cells connected in series is charged, some of the plurality of unit cells are selectively connected to a power converter (for example, see Patent Document 2). Since the charging control unit for performing such split charging control selectively charges a plurality of unit cells constituting the secondary battery, it is possible to use a smaller-scale power converter. Since, thereby the charging control unit for performing split charging control can decrease power loss in the power converter, it can reduce the heat generation of the power converter.

PRIOR ART DOCUMENT

Patent Document

Patent Document 1: Japanese Patent Laid-Open No. 2013-110899
Patent Document 2: Japanese Patent Laid-Open No. 2009-296820

SUMMARY OF THE INVENTION

Problems to be Solved by the Invention

However, since the charging control unit for performing the above described split charging control performs time-division charging in which a plurality of unit cells constituting the secondary battery are selectively charged, there is a possibility that it takes long hours to charge the secondary battery to a fully charged state.

The present invention has been made in view of the above described situation, and its objective is to provide an uninterruptible power supply unit which can be charged in a short time without generating much heat.

Means for Solving the Problems

<First Aspect of the Present Invention>

A first aspect of the present invention is an uninterruptible power supply unit, comprising: an input/output terminal connected in parallel with a power line for supplying power from an external power supply to a load device; a battery unit whose rated voltage is a voltage same as a voltage of the external power supply; a voltage converter that converts the voltage of the external power supply into a voltage corresponding to a difference between the rated voltage of the battery unit and a charging voltage of the battery unit; a charging circuit that charges the battery unit with a voltage equal to the voltage of the external power supply added with the output voltage of the voltage converter; and a discharging circuit that discharges power from the battery unit to the load device through the input/output terminal in an event that the external power supply is interrupted.

Here, the charging voltage of the battery unit is a voltage higher than the rated voltage of the battery unit, and a voltage needed for charging the battery unit up to a fully charged state. On the other hand, the voltage of the external power supply is a voltage same as the rated voltage of the battery unit. For that reason, it is not possible to charge the battery unit with the voltage of the external power supply as it is.

The voltage converter converts the voltage of the external power supply into a voltage corresponding to a difference between the rated voltage of the battery unit and the charging voltage of the battery unit. Then the charging circuit charges the battery unit with a voltage equal to the voltage of the external power supply added with the output voltage of the voltage converter. Since, thereby the battery unit can be charged with the charging voltage of the battery unit, there is no need of performing time-division charging control as in the conventional art. Therefore, it is possible to charge the battery unit up to a fully charged state in a short time.

Thus, since in the present invention, the voltage of the external power supply is converted into a voltage corresponding to a difference between the rated voltage of the battery unit and the charging voltage of the battery unit, it is possible to significantly reduce power loss which occurs in the voltage converter compared with the conventional art in which the voltage of the external power supply is boosted. Thereby, it is possible to significantly reduce the heat generation of the voltage converter than in the conventional art.

Thus, the first aspect of the present invention can achieve an advantageous effect that it is possible to provide an uninterruptible power supply unit which can be charged in a short time without generating much heat.

<Second Aspect of the Present Invention>

A second aspect of the present invention is an uninterruptible power supply unit, comprising: an input/output terminal connected in parallel with a power line that supplies power from an external power supply to a load device; a battery unit which includes a first battery pack and a second battery back, which are connected in series, wherein a rated voltage of the battery unit is a voltage same as the voltage of the external power supply; a voltage converter that converts the voltage of the external power supply into a voltage corresponding to a difference between the rated voltage of the battery unit and the charging voltage of the battery unit; a charging circuit that charges the first battery pack with the output voltage of the voltage converter, and charges the second battery pack with the voltage of the external power supply; and a discharging circuit that discharges power from the battery unit to the load device through the input/output terminal in an event that the external power supply is interrupted.

The voltage converter converts the voltage of the external power supply into a voltage corresponding to a difference between the rated voltage of the battery unit and the charging voltage of the battery unit. Then, the charging unit charges the first battery pack with the output voltage of the voltage converter, and the second battery pack with the voltage of the external power supply. This makes it possible to charge the first battery pack and the second battery pack with the charging voltage of each (voltage higher than the rated voltage). Further, since the charging of the first battery pack and the charging of the second battery pack can be performed in parallel simultaneously, there is no need of performing time-division charging control as in the conventional art. Therefore, it is possible to charge the battery unit to a fully charged state in a short time.

Further, in the present invention, since the voltage converter converts the voltage of the external power supply into a voltage corresponding to a difference between the rated voltage of the battery unit and the charging voltage of the battery unit, it is possible to significantly reduce power loss which occurs in the voltage converter compared with the conventional art in which the voltage of the external power supply is boosted. As a result, it becomes possible to significantly reduce heat generation of the voltage converter than in the conventional art.

Thus, the second aspect of the present invention can achieve an advantageous effect that it is possible to provide an uninterruptible power supply unit which can be charged in a short time without generating much heat.

Advantageous Effects of the Invention

According to the present invention, it is possible to provide an uninterruptible power supply unit which can be charged in a short time without generating much heat.

MODE FOR CARRYING OUT THE INVENTION

Figure 1:
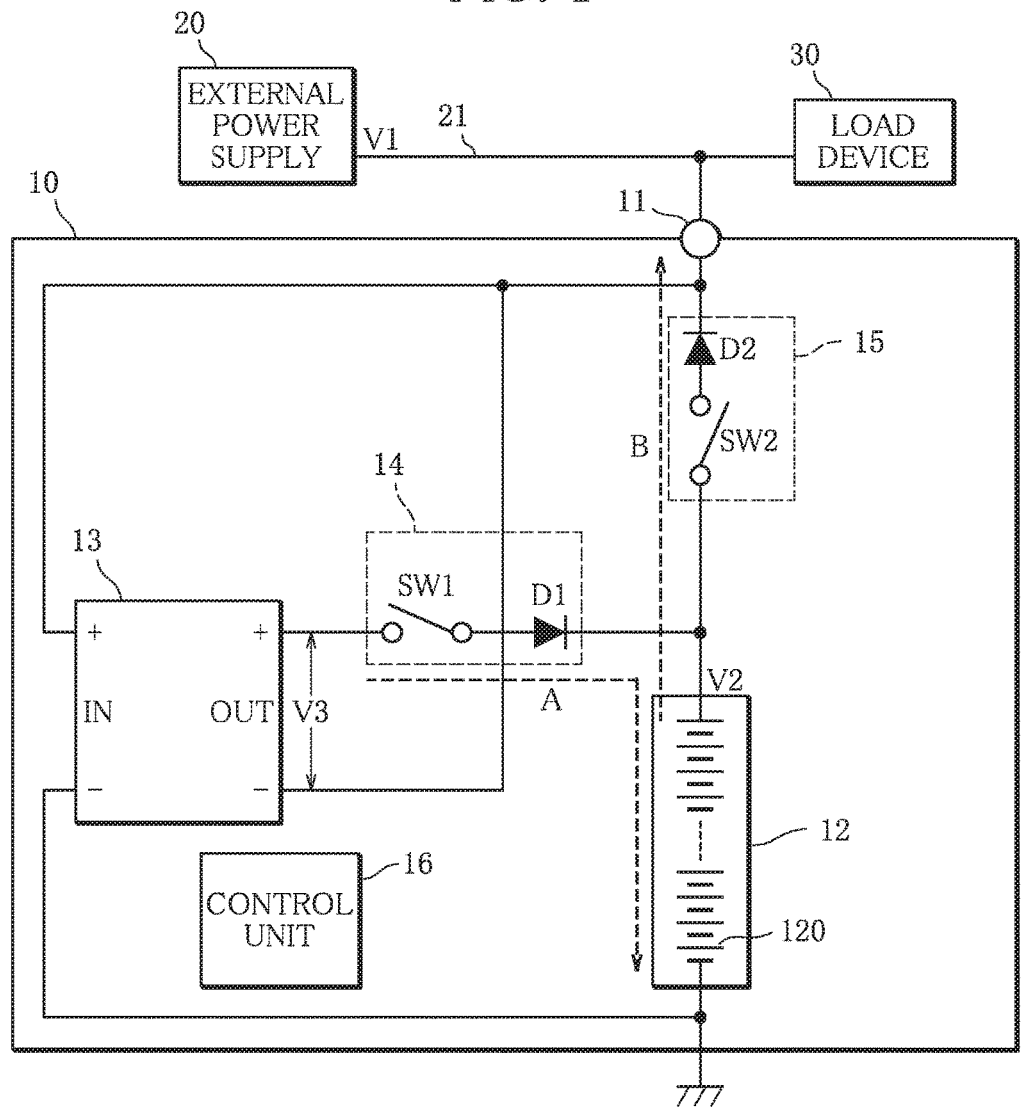
FIG. 1 is a circuit diagram to illustrate a first embodiment of an uninterruptible power supply unit according to the present invention.

Hereinafter, embodiments of the present invention will be described referring to the drawings.

Note that the present invention will not be limited to embodiments described below, and it is possible without saying to make various modifications within the scope of the invention set forth in the claims of patent.

First Embodiment

A first embodiment of the present invention will be described referring to FIG. 1.

FIG. 1 is a circuit diagram to illustrate the first embodiment of an uninterruptible power supply unit 10 according to the present invention.

The uninterruptible power supply unit 10 is a power supply unit that supplies power to a load device 30 to continue the operation of the load device 30 in the event that power cannot be supplied from an external power supply 20 to the load device 30 due to power interruption, etc.

The uninterruptible power supply unit 10 of the first embodiment includes an input/output terminal 11, a battery unit 12, a DC/DC converter 13, a charging circuit 14, a discharging circuit 15, and a control unit 16.

The input/output terminal 11 is connected in parallel with a power supply line 21 that supplies power from the external power supply 20 to the load device 30. Here, the external power supply 20 is, for example, a power supply unit that converts commercial AC power into a DC power of voltage V1. The load device 30 is an electronic instrument that operates with DC power of a voltage V1.

The battery unit 12 is a battery power supply whose rated voltage is a voltage same as the voltage V1 of the external power supply 20. The battery unit 12 includes a battery pack 120 which is constituted by connecting in series or in parallel alkaline secondary batteries such as nickel-hydrogen secondary batteries. Moreover, the battery unit 12 includes a circuit for detecting the voltage and temperature of the battery pack 120 (omitted from illustration).

The DC/DC converter 13 as a "voltage converter" converts the voltage V1 of the external power supply 20 into a voltage V3 corresponding to a difference between the rated voltage of the battery unit 12 and the charging voltage of the battery unit 12. To be more specific, the DC/DC converter 13 is a step-down DC/DC converter of input/output insulation type, which steps down the voltage V1 of the external power supply 20 to the voltage V3. In the input side of the DC/DC converter 13, a "+" terminal is connected to the input/output terminal 11, and a "−" terminal is connected to the ground. Further, in the output side of the DC/DC converter 13, a "+"

terminal is connected to one end side of a switch SW1 of the charging circuit 14, and a "−" terminal is connected to the input/output terminal 11.

The charging circuit 14 includes the switch SW1 and a diode D1. To be more specific, the charging circuit 14 is arranged such that one end side of the switch SW1 is connected to the "+" terminal of the output side of the DC/DC converter 13, and the other end side of the switch SW1 is connected to the anode of the diode D1. The cathode of the diode D1 is connected to a positive electrode terminal of the battery unit 12. In the charging circuit 14 of such configuration, turning on the switch SW1 causes the battery unit 12 to be charged with a voltage which is equal to the voltage V1 of the external power supply 20 added with the output voltage V3 of the DC/DC converter 13.

The discharging circuit 15 includes a switch SW2, and a diode D2. To be more specific, the discharging circuit 15 is configured such that one end side of the switch SW2 is connected to the positive electrode terminal of the battery unit 12, and the other end side of the switch SW2 is connected to the anode of the diode D2. The cathode of the diode D2 is connected to the input/output terminal 11. In the discharging circuit 15 of such configuration, turning on the switch SW2 during interruption of the external power supply allows discharge of power from the battery unit 12 to the load device 30 through the input/output terminal 11.

The control unit 16 is a known microcomputer control device. The control unit 16 performs the control such as on/off of the switch SW1 and the switch SW2 based on the voltage V2 and the temperature etc. of the battery unit 12.

Next, the operation of the uninterruptible power supply unit 10 will be described further referring to FIG. 1.

The control unit 16 charges the battery unit 12 to a fully charged state with power of the external power supply 20 during normal time, that is, in a state in which power is being supplied from the external power supply 20 to the load device 30. To be more specific, turning on the switch SW1 and turning off the switch SW2 will cause the battery unit 12 to be charged with a voltage equal to the voltage V1 of the external power supply 20 added with the output voltage V3 of the DC/DC converter 13 (symbol A). Then, after the battery unit 12 is charged to a fully charged state, the switch SW1 is turned off. On the other hand, the control unit 16 discharges power of the battery unit 12 to the load device 30 through the input/output terminal 11 by turning on the switch SW2 in the event of power interruption (symbol B).

The charging voltage of the battery unit 12 is a voltage higher than the rated voltage of the battery unit 12, and is also a voltage needed to charge the battery unit 12 to a fully charged state. As described above, the output voltage V3 of the DC/DC converter 13 corresponds to a difference between the rated voltage of the battery unit 12 and the charging voltage of the battery unit 12. Also, the rated voltage of the battery unit 12 is a voltage same as the voltage V1 of the external power supply 20.

For example, a charging voltage needed to charge a battery cell of nickel-hydrogen secondary battery whose rated voltage is 1.35 V to a fully charged state is about 1.5 V. Here, the voltage V1 of the external power supply 20 is assumed to be 54V. Further, 40 battery cells of nickel-hydrogen secondary battery whose rated voltage is 1.35 V are connected in series to constitute a battery unit 12 whose rated voltage is 54V which is same as the voltage V1 of the external power supply 20. In this case, the charging voltage needed to charge the battery unit 12 to a fully charged state is about 60 V (1.5 V×40). Therefore, it may be specified such that the output voltage V2 of the DC/DC converter 13 is about 6 V.

Since the uninterruptible power supply unit 10 according to the present invention is configured such that the battery unit 12 is charged with the charging voltage (voltage V1+V3) by turning on the switch SW1, it is possible to charge the battery unit 12 to a fully charged state. As a result, in the uninterruptible power supply unit 10 according to the present invention, since there is no need of performing time-division charging control as in the conventional art, it is possible to charge the battery unit 12 to a fully charged state in a short time.

Moreover, the DC/DC converter 13 steps down the voltage V1 of the external power supply 20 to a voltage V3 corresponding to a difference between the rated voltage of the battery unit 12 and the charging voltage of the battery unit 12. For that reason, the uninterruptible power supply unit 10 according to the present invention can significantly reduce power loss that occurs in the DC/DC converter 13 compared with the conventional art in which the voltage V1 of the external power supply 20 is boosted. Thereby, the uninterruptible power supply unit 10 according to the present invention can significantly reduce heat generation of the DC/DC converter 13 than in the conventional art.

Thus, according to the present invention, it is possible to provide an uninterruptible power supply unit 10 which can be charged in a short time without generating much heat.

Second Embodiment

A second embodiment of the present invention will be described referring to FIG. 2.

Figure 2:
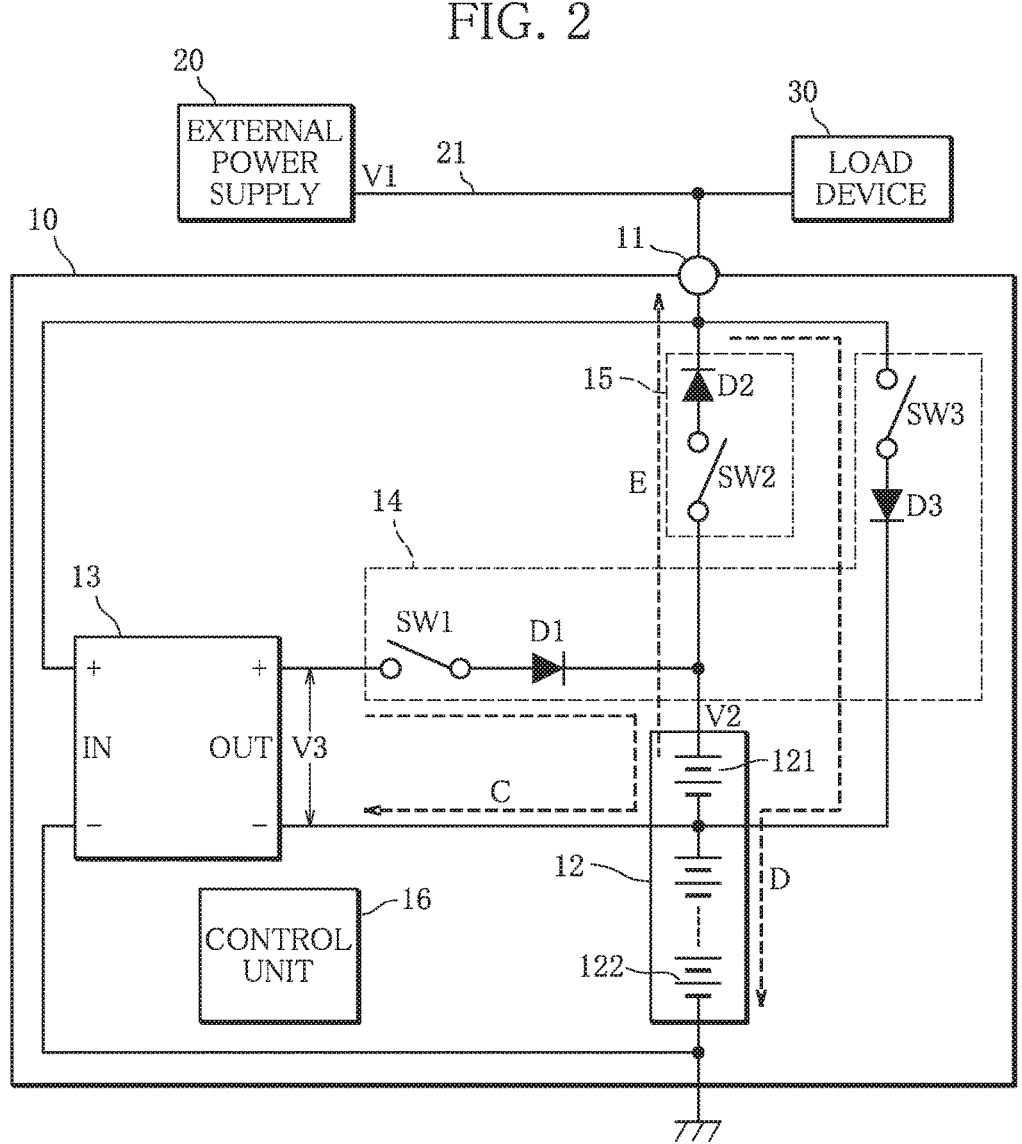
FIG. 2 is a circuit diagram to illustrate a second embodiment of the uninterruptible power supply unit according to the present invention.

FIG. 2 is a circuit diagram to illustrate a second embodiment of the uninterruptible power supply unit 10 according to the present invention.

The uninterruptible power supply unit 10 of the second embodiment includes, as with the first embodiment, an input/output terminal 11, a battery unit 12, a DC/DC converter 13, a charging circuit 14, a discharging circuit 15, and a control unit 16. Then, the uninterruptible power supply unit 10 of the second embodiment differs from that of the first embodiment in the configurations of the battery unit 12 and the charging circuit 14. Since other components are the same as those of the first embodiment, the same reference symbol is given to the same component and detailed description thereof will be omitted.

The battery unit 12 of the second embodiment includes a first battery pack 121 and a second battery pack 122 which are connected in series, wherein the rated voltage thereof is a voltage same as the voltage V1 of the external power supply 20. In the second embodiment, a voltage equal to the sum of the voltage of the first battery pack 121 and the voltage of the second battery pack 122 becomes the voltage V2 of the battery unit 12.

The charging circuit 14 of the second embodiment further includes a switch SW3 and a diode D3 in addition to the switch SW1 and the diode D1. To be more specific, the charging circuit 14 is configured such that one end side of the switch SW1 is connected to a "+" terminal on the output side of the DC/DC converter 13, and the other end side of the switch SW1 is connected to the anode of the diode D1. The cathode of the diode D1 is connected to the positive electrode terminal of the first battery pack 121. An "−" terminal of the output side of the DC/DC converter 13 is connected to the negative electrode of the first battery pack 121. Moreover, the charging circuit 14 is configured such that one end side of the switch SW3 is connected to the input/output terminal 11, and the other end side of the switch SW3 is connected to the anode of the diode D3. The cathode of the diode D3 is connected to the positive electrode terminal of the second battery pack 122.

The charging circuit 14 of such configuration can charge the first battery pack 121 with the output voltage V3 of the DC/DC converter 13, and charges the second battery pack 122 with the voltage V1 of the external power supply 20. To be more specific, the charging circuit 14 allows the first battery pack 121 to be charged with the output voltage V3 of the DC/DC converter 13 by turning on the switch SW1. Moreover, the charging circuit 14 allows the second battery pack 122 to be charged with the voltage V1 of the external power supply 20 by turning on the switch SW3.

The control unit 16 charges the battery unit 12 to a fully charged state with power of the external power supply 20 during normal time, that is, in a state in which power is supplied from the external power supply 20 to the load device 30. To be more specific, by turning on the SW1 and the switch SW3, and turning off the switch SW2, it becomes possible to charge the first battery pack 121 with the output voltage V3 of the DC/DC converter 13 (symbol C), and charges the second battery pack 122 with the voltage V1 of the external power supply 20 (symbol D). Then, after the first battery pack 121 is charged to a fully charged state, the switch SW1 is turned off. Moreover, after the second battery pack 122 is charged to a fully charged state, the switch SW3 is turned off. On the other hand, the control unit 16 discharges power of the battery unit 12 to the load device 30 through the input/output terminal 11 by turning on the switch SW2 in the event of power interruption (symbol E).

For example, the charging voltage needed to charge the battery cell of the nickel-hydrogen secondary battery whose rated voltage is 1.35 V up to a fully charged state will be about 1.5 V. Here, the voltage V1 of the external power supply 20 is assumed to be 54 V. Moreover, 40 battery cells of nickel-hydrogen secondary battery whose rated voltage is 1.35 V are connected in series to constitute a battery unit 12 whose rated voltage is 54V which is same as the voltage V1 of the external power supply 20. In this case, the charging voltage needed to charge the battery unit 12 to a fully charged state will be about 60 V (1.5 V×40). Therefore, it may be specified such that the output voltage V3 of the DC/DC converter 13 is about 6 V.

Then, if the first battery pack 121 of the battery unit 12 is constituted by connecting in series 4 battery cells of the nickel-hydrogen secondary battery whose rated voltage is 1.35 V, the rated voltage thereof will become 5.4 V. Further, the second battery pack 122 of the battery unit 12 will have a rated voltage of 48.6 V if it is constituted by connecting in series the remaining 36 battery cells of the nickel-hydrogen secondary batteries. Since the charging voltage needed to charge the first battery pack 121 whose rated voltage is 5.4 V to be fully charged state is 6 V (1.5 V×4), it is possible to charge it to a fully charged state with the output voltage V3 (about 6 V) of the DC/DC converter 13. Moreover, in the case of the secondary battery pack 122 whose rated voltage is 48.6 V, since the charging voltage needed to charge it to a fully charged state is 54 V (1.5 V×36), it can be charged to a fully charged state with the voltage V1 (54 V) of the external power supply 20 in parallel with the charging of the first battery pack 121.

In this way, the uninterruptible power supply unit 10 of the second embodiment allows the first battery pack 121 and the second battery pack 122 to be charged with the charging voltage of each (a voltage higher than its rated voltage) by turning on the switch SW1 and the switch SW3. Thus, the charging of the first battery pack 121 and the charging of the second battery pack 122 can be performed simultaneously in parallel. Since, accordingly, the uninterruptible power supply unit 10 according to the present invention does not need to perform time division charging control as in the conventional art, it can charge the battery unit 12 to a fully charged state in a short time.

Moreover, the DC/DC converter 13 steps down the voltage V1 of the external power supply 20 to a voltage V3 corresponding to a difference between the rated voltage of the battery unit 12 and the charging voltage of the battery unit 12. For that reason, the uninterruptible power supply unit 10 according to the present invention can significantly reduce power loss which occurs in the DC/DC converter 13 compared with the conventional art in which the voltage V1 of the external power supply 20 is boosted. Thereby, the uninterruptible power supply unit 10 according to the present invention can significantly reduce the heat generation of the DC/DC converter 13 than in the conventional art.

Thus, according to the present invention, it is possible to provide an uninterruptible power supply unit 10 which can be charged in a short time without generating much heat.

EXPLANATION OF REFERENCE SIGNS

10 Uninterruptible power supply unit
11 Input/output terminal
12 Battery unit
13 DC/DC converter
14 Charging circuit
15 Discharging circuit
16 Control unit
20 External power supply
21 Power supply line
30 Load device

The invention claimed is:

1. An uninterruptible power supply unit, comprising:
an input/output terminal connected in parallel with a power line for supplying power from an external power supply to a load device;
a battery unit whose rated voltage is a voltage equal to a voltage of the external power supply;
a voltage converter that converts the voltage of the external power supply into an output voltage corresponding to a difference between the rated voltage of the battery unit and a charging voltage of the battery unit;
a charging circuit that charges the battery unit with a voltage equal to the voltage of the external power supply added with the output voltage of the voltage converter; and
a discharging circuit that discharges power from the battery unit to the load device through the input/output terminal in an event that the external power supply is interrupted.

2. An uninterruptible power supply unit, comprising:
an input/output terminal connected in parallel with a power line that supplies power from an external power supply to a load device;
a battery unit which includes a first battery pack and a second battery back, which are connected in series, and wherein a rated voltage of the battery unit is a voltage equal to the voltage of the external power supply;
a voltage converter that converts the voltage of the external power supply into an output voltage corresponding to a difference between the rated voltage of the battery unit and the charging voltage of the battery unit;
a charging circuit that charges the first battery pack with the output voltage of the voltage converter, and charges the second battery pack with the voltage of the external power supply; and
a discharging circuit that discharges power from the battery unit to the load device through the input/output terminal in an event that the external power supply is interrupted.

\* \* \* \* \*